United States Patent [19]

Durand et al.

[11] 4,298,472

[45] Nov. 3, 1981

[54] PROCESS FOR MANUFACTURING IMPREGNATED SILICAS AND THE USE OF THESE SILICAS FOR ANALYSIS OR PURIFICATION OF INDUSTRIAL PRODUCTS

[75] Inventors: Jean-Pierre Durand, La Celle St Cloud; Nicole Petroff, Jouy en Josas, both of France

[73] Assignee: Institut Francais du Petrole, Rueil-Malmaison, France

[21] Appl. No.: 129,956

[22] Filed: Mar. 13, 1980

[30] Foreign Application Priority Data

Mar. 13, 1979 [FR] France ............................... 79 06383

[51] Int. Cl.³ .......................... C02F 1/68; B01J 31/02; C07C 7/12
[52] U.S. Cl. ................................ 210/198.2; 252/428; 23/230 HC; 208/310 Z; 585/830
[58] Field of Search ...................... 23/230 HC, 230 M; 422/70; 210/31 C, 198.2; 208/310 Z; 585/830; 252/428, 426, 414

[56] References Cited

U.S. PATENT DOCUMENTS 2,632,778 3/1953 Jorach .................................. 585/830
3,855,333 12/1974 Neuzil ............................ 208/310 Z

OTHER PUBLICATIONS

Majors, Ronald E., Analylical Chemistry, vol. 44, No. 11, Sep. 1972, pp. 1722 to 1726.
Scheflan, Leopold et al., The Handbook of Solvents, D. Van Nostrand Co., Inc., New York, 1953, pp. 408-409.

*Primary Examiner*—William F. Smith
*Assistant Examiner*—Chris Konkol
*Attorney, Agent, or Firm*—Millen & White

[57] ABSTRACT

Impregnated silica is manufactured by passing a substantially anhydrous solution of a polar organic compound in a non-polar organic diluent through a bed of substantially anhydrous silica particles, under a pressure of at least 200 bars so as to modify the adsorbent properties of the silica particles with the selective properties of the polar compound without impairing the silica particle adsorbing efficiency.

17 Claims, 2 Drawing Figures

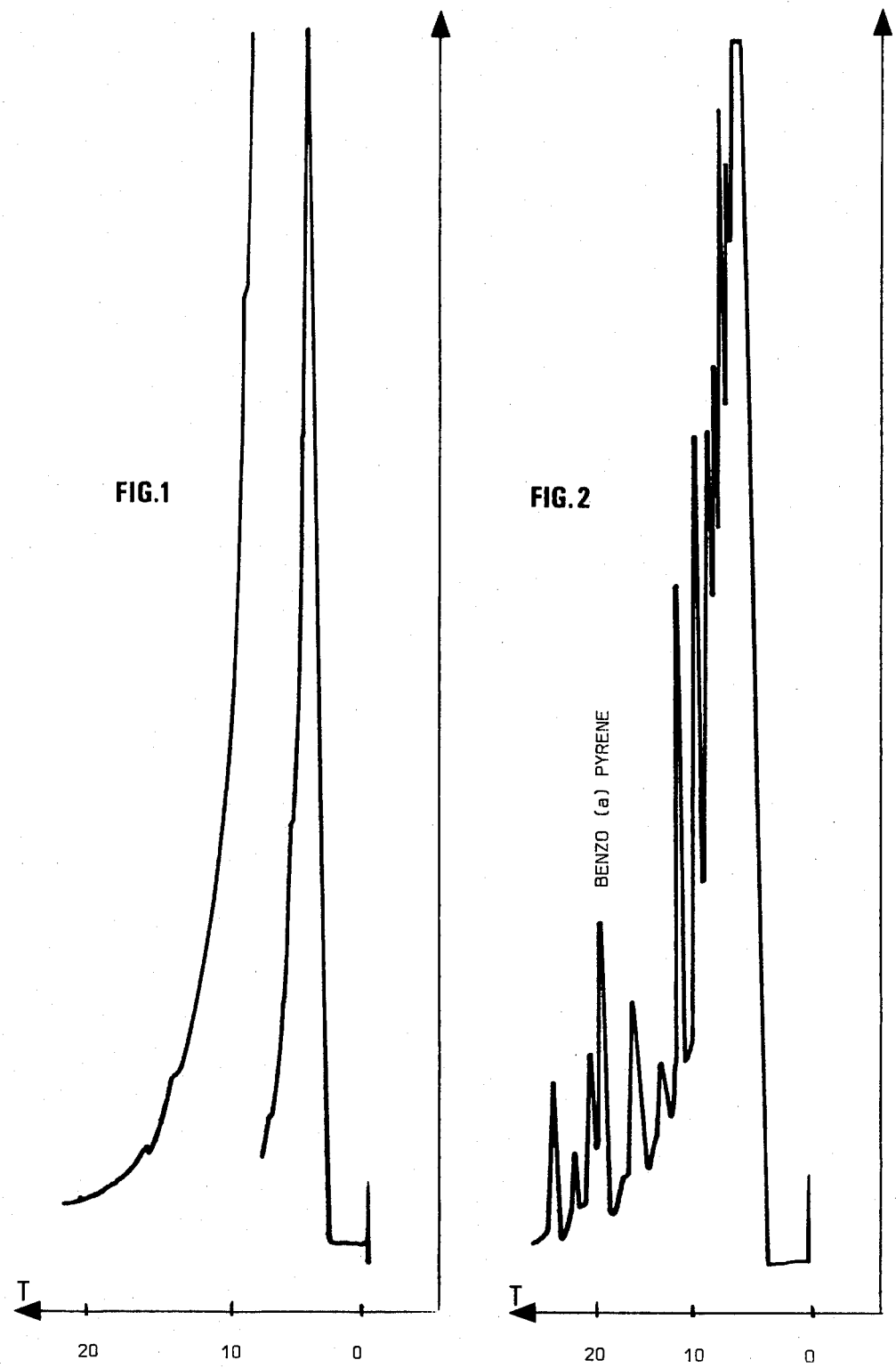

PROCESS FOR MANUFACTURING IMPREGNATED SILICAS AND THE USE OF THESE SILICAS FOR ANALYSIS OR PURIFICATION OF INDUSTRIAL PRODUCTS

BACKGROUND OF THE INVENTION

The present invention relates to a new process for producing impregnated silica and to the use of the resultant impregnated silica, particularly in analytical methods and liquid or gas phase chromatography and for the purification of industrial products.

Since a few years, substantial improvements have been made in analytical liquid chromatography through the use of adsorbents consisting of silica microparticles. The latter, when used in the presence of water in controlled amount, are very efficient as concerns certain separations. They are not, however, satisfactory for other separations. It has then been attempted to modify these silica microparticles by depositing polar compounds thereupon, hereinafter designated as "solvents", in order to improve the selectivity as concerns certain types of separations, for example, those for which said polar compounds have a substantial selectivity when used in conventional liquid-liquid or liquid-vapor extraction.

Unfortunately it has been found that, when this deposition of "solvent" is effected according to conventional techniques, silica loses a large part of its efficiency; when expressing the latter as the "equivalent height of a theoretical plate" (EHTP), ratios of 10:1 are commonly noted when comparing the unimpregnated silicas to the impregnated silicas, and the so-prepared columns are not stable.

SUMMARY OF THE INVENTION

The main object of the invention is to provide an impregnation method for producing impregnated silicas of high efficiency and retaining the selectivity of the "solvent" used.

As a result of this unique method for the solvent deposition:

1—The efficiency of the microsilica columns is retained, i.e. the EHTP ranges, for example, from 10 to 20 microns for columns of a 15 to 30 cm length (internal diameter: 4.2 mm).

2—The selective properties of the "solvent" are retained since the partition coefficients calculated from the chromatograms of the examined solutes are close to those obtained by the conventional methods of liquid-liquid equilibrium.

As the choice of the solvent is left to the user, this technique provides for a very specific adjustment of the analytical method for fine analyses and avoids any possible adsorption effect of silica.

The process of the invention consists of passing a solution of the "solvent" through a bed of substantially anhydrous silica particles, under an input pressure higher than 200 bars (preferably at least 300 bars).

The flow rate of the solution is not critical. It depends on the pressure and also on the diameter and the height of the column. Thus, for columns of a diameter from 3 to 50 mm and for heights from 0.2 to 2 meters, the flow rates are usually above 0.3 liter per hour, for example 0.5 to 5 liters per hour.

The size of the silica particles depends, to a certain extent, on the use thereof as described hereinafter. For analytical use in liquid chromatography, a particle size of about 5 to 20 microns is preferred; however, for industrial use, a size of about 50 to 200 microns is preferred. As a rule, particles of 5 to 500 microns give satisfactory results.

Silica is introduced into the apparatus of use by any convenient means, for example, in the dry state or as a suspension in a light saturated hydrocarbon. The packing may be improved, particularly in the case of very fine particles, by applying pressure, for example, 350 bars or more.

The dehydration, when necessary, may be effected by any appropriate means, for example, by heating at 100°–200° C. under reduced pressure.

The impregnation agent (the "solvent") is introduced as a solution in a substantially anhydrous non-polar or weakly polar organic liquid, preferably a saturated hydrocarbon or a chlorinated saturated hydrocarbon. The concentration of the solution is advantageously lower than 2% b.w., preferably from 0.3 to 1% b.w. In a preferred embodiment, a sufficient volume of solution is passed, so that the concentration of the impregnation agent in the diluent organic liquid is identical at the inlet and at the outlet of the column, so as to attain an equilibrium. Other useful diluents for the polar compounds are ethers, for example, tetrahydrofuran.

The weight of "solvent" introduced into the silica is, for example, 5 to 50% b.w. of the latter; it may be the higher as the specific surface of the silica is greater and the concentration of the impregnation solvent is higher.

The impregnation agent is a polar organic solid or liquid material, i.e. an organic compound containing carbon, hydrogen and at least one heteroatom such as O, S, N and/or P, and optionally a halogen. It is preferably chosen in view of its known extracting properties and of the later described use of the column. As a rule, any solvent known for use in liquid-liquid or liquid-vapor extraction may be used, for example, dimethylsulfoxide, N-methyl pyrrolidone, furfural, ethylene glycol, dimethyl formamide, sulfolane, polyethylene glycol 400, tricyanoethoxypropane, N-formyl morpholine and malonitrile. The impregnation agent may also be a solid material, for example, dibenzylsulfoxide, polyethylene glycol 20 M or dimethylsulfone.

The so-prepared silica may be used conventionally for absorption or adsorption, for analytic purposes or for industrial extractions. The substances which separate may be detected as they leave the column.

An eluent may be passed therethrough, which may be selected, as the diluent above, from the nonpolar or weakly polar organic liquids. Saturated hydrocarbons are preferred, for example, heptane or cyclohexane, or a chlorinated solvent, for example, methylene chloride or dichloroethane, or an ether. Depending on the "solvent" concentration of the silica, necessary to the required separation, there is used a pure eluent or an eluent charged with a certain amount of "solvent".

When the column is to be re-used for a subsequent absorption/absorption operation, it is advantageous to charge the eluent with impregnation liquid to compensate for the losses by entrainment.

The so-prepared columns may be used to effect a number of separations between organic compounds, for example, for separating aromatic hydrocarbons, for purifying lubricating oils or food oils, or to fractionate sulfonates. Since they have a high separating power they can be used to effect separations which are difficult to achieve by other means.

The invention is of particular interest for the separation of condensed polynuclear aromatic hydrocarbons and their heterocyclic homologs containing a sulfur or nitrogen atom, comprising at least 3 rings, and optionally having short alkyl radicals some of which are carcinogenic, for example, benzo (a) pyrene. The columns prepared by the method of the invention allow the detection of these compounds in oils and also their removal.

It will be appreciated that most of the diluents have a dielectric constant ($\epsilon$) at 20° C. of at most 10, whereas the "polar compounds" have a dielectric constant of at least 15, usually above 25.

EXAMPLE 1

A column is to be prepared with the insertion of dimethyl sulfoxide (DMSO) on microsilica particles.

A stainless steel column, provided with a sintered metal filter ($2\mu$), of a 30 cm length and an internal diameter of 4.2 mm, is filled with 3 g of "Lichrosorb" silica (Merck) of $5\mu$ particles (specific surface of 550 $m^2/g$). The filling is effected with a suspension of this silica in heptane, by applying an absolute pressure of 450 bars. Drying is then performed in nitrogen for 2 hours and the dehydration is effected by heating at 180° C. for 1 hour at a 0.1 mm Hg pressure.

1 Liter of a 0.3% b.w. DMSO solution in n-heptane is then passed, at a rate of 600 ml/h, under an absolute top pressure of 400 bars (the bottom pressure is the normal atmospheric pressure).

The column is then ready for use.

By way of example, the column may be fed with a 0.3% b.w. DMSO solution in n-heptane, at a rate of 60 ml/h and at a top pressure of 70 bars in the column. 2 microliters of lubricating oil having been added and the efficiency of the column determined (15,000 plates); the equivalent height of a theoretical plate for benzo (a) pyrene was 20 microns.

The detection is effected with a filter spectrofluorometer:

$\lambda exc = 325$ to 385 nm
$\lambda emission > 405$ nm

The analysis required 20 minutes and the minimum detectable amount of benzo (a) pyrene determined: 5 $\mu g$ per liter of oil.

FIG. 1 represents the chromatogram obtained with a fresh oil.

FIG. 2 represents the chromatogram obtained with a used oil; the benzo (a) pyrene peak is noted.

EXAMPLE 2

A stainless steel pipe was filled with 300 g of dry Davison silica as 75–150$\mu$ particles, of a 500 $m^2/g$ specific surface.

The dehydration was then effected by heating for 2 hours at 180° C. under reduced pressure.

5 Liters of a mixture of n-heptane and dichloroethane in 3/1 proportions by volumne and charged with 2% by weight of DMSO was passed therethrough. The top pressure was 300 bars and the feed rate was 1 liter per hour.

The column was thus prepared for use.

2 Liters of n-heptane containing 0.3% b.w. of DMSO were passed at the same rate of 1 liter per hour, to equilibrate the column in view of the subsequent operation:

The column was used to purify a hydro-treatment oil containing 0.3% of condensed polynuclear aromatic hydrocarbons, at a concentration of 25% b.w. in n-heptane charged with 0.3% b.w. of DMSO. The above solution was continuously supplied up to a volume corresponding to 2 liters of oil, this volume corresponding approximately to the purification capacity of the column.

The resultant oil was analyzed by liquid phase chromatography; it no longer contained condensed polynuclear aromatic hydrocarbons (PAH) and appeared uncolored.

Purification capacities substantially higher than 2 liters of oil were obtained for not so high purification rates.

The column was regenerated by feeding, in the reverse direction, 1 liter of dichloroethane containing 1% of DMSO, to eluate the retained PAH, then the column was re-equilibrated with 2 liters of heptane containing 0.3% b.w. of DMSO, as above described.

In the preceding examples, when using the column to analyze or purify a lubricating oil, the oil was diluted with heptane containing a low amount of a polar compound (DMSO). The presence of the polar compound is however not obligatory but only preferred so as to proceed with the optimum adsorption conditions.

EXAMPLE 3

A column was prepared by inserting ethylene glycol onto microsilica particles. The characteristics of the column, the filling and the dehydration were identical to those of example 1.

1 Liter of n-heptane solution saturated with ethylene glycol (about 0.1% b.w.) was then passed at a rate of 600 ml/h, the absolute top pressure of the column being 400 bars.

The column was then ready for use.

By way of example, the column was used for separating a crude oil into distinct families of saturated hydrocarbons, aromatic hydrocarbons and polar compounds. The detection was effected with a differential refractometer for the saturated compounds and a UV spectrophotometer at the wave length of 290 nm for the aromatic compounds and the polar compounds. A n-heptane solution was passed at a rate of 60 ml/h at a column top pressure of 70 bars. 10 $\mu l$ of a sample of crude oil diluted by half in n-heptane was introduced. The saturated hydrocarbons were eluted in 4 minutes, the aromatics in 20 minutes and the polar compounds in 20 minutes with the same solvent after inversion of the elution fluid.

EXAMPLE 4

This example is given to show the influence of the pressure, during the percolation step, on the efficiency of the resultant columns.

A stainless steel column, provided with a sintered metal filter ($2\mu$) of a 20 cm length and a 8 mm internal diameter, was filled with Spherosil XOA 600 silica (Rhône-Progil) as $10\mu$ particles (specfic surface: 570 $m^2/g$). The filling and the dehydration were effected in the same conditions as in example 1.

The column top pressure being 5 bars, there was passed a percolation solution of n-$C_7$+0.35% b.w. DMSO. After 200 ml, the efficiency of the column was 8500 plates, corresponding to a EHTP (equivalent height of a theoretical plate) of 24 microns, as concerns benzo (a) pyrene. This is the same value as observed with columns of unmodified silica. After 1900 ml of the impregnation solution, the efficiency was only 1200 plates, corresponding to a EHTP of 170 microns.

By way of comparison, when effecting the percolation under 350 bars, instead of 5 bars, the EHTP was 24 microns after 200 ml and 20 microns after 1900 ml of the impregnation solution.

What is claimed is:

1. A process for manufacturing an adsorbent composition comprising impregnated silica, which comprises passing a substantially anhydrous solution of a polar organic compound in a non-polar organic diluent through a bed of substantially anhydrous silica particles, under an input pressure of at least 200 bars absolute, and the amount of said solution passed being sufficient for modifying the adsorbent properties of the silica particles by providing said silica particles with the selective properties of said polar organic compound, without substantially impairing the absorbing efficiency of said silica particles.

2. A process according to claim 1, further comprising passing said solution at a rate of at least 0.3 liter per hour.

3. A process according to claim 2, wherein said rate is from 0.5 to 2 liters per hour.

4. A process according to claim 1, wherein the pressure at which said solution is passed is at least 300 bars.

5. A process according to claim 1, wherein the concentration of said polar organic compound of said solution is at most 2% by weight.

6. A process according to claim 5, wherein the concentration of said polar organic compound of said solution is from 0.3 to 1% by weight.

7. A process according to claim 1, wherein said polar organic compound is selected from the group consisting of dimethylsulfoxide, N-methyl pyrrolidone, furfural, ethylene glycol, dimethylformamide, sulfolane, polyethylene glycol 400, tri-cyano ethoxy propane, N-formyl morpholine, malonitrile, dibenzyl sulfoxide, polyethylene glycol 20 M and dimethyl sulfone.

8. A process according to claim 1, wherein said silica particles have a size from 5 to 500 microns.

9. A process according to claim 1, wherein said non-polar diluent is selected from the group consisting of the saturated hydrocarbons and the chlorinated saturated hydrocarbons.

10. A process according to claim 1, wherein said non-polar diluent is tetrahydrofuran.

11. The use of an impregnated silica, as obtained by the process of claim 1, to separate the constituents of a mixture of organic compounds.

12. The use of an impregnated silica, according to claim 11, wherein said mixture to be separated is a lubricating oil.

13. A process according to claim 1, further comprising passing an amount of said substantially anhydrous solution sufficient to introduce into said bed a proportion of said polar organic compound in an amount of 5 to 50% by weight of said substantially anhydrous silica particles.

14. An impregnated silica obtained by passing a substantially anhydrous solution of a polar organic compound in a non-polar organic diluent through a bed of substantially anhydrous silica particles, under an input pressure of at least 200 bars absolute, and the amount of said solution passed being sufficient whereby said silica particles comprise the selective properties of said polar organic compound without having the adsorbing efficiency of said silica particles substantially impaired.

15. An impregnated silica as in claim 14 wherein the amount of solution passed in impregnating said silica bed is such that said silica bed comprises a proportion of said polar organic compound in an amount of 5 to 50% by weight of said substantially anhydrous silica particles.

16. The use of a column packed with an impregnated silica as obtained by the process of claim 1 to separate the constituents of a mixture of organic compounds comprising passing the mixture of organic compounds through the column at a relatively low pressure as compared to the pressure used to impregnate the silica.

17. The use of a column as in claim 16 wherein the pressure at which the mixture of organic compounds is passed is equal to less than 70 bars.

* * * * *

UNITED STATES PATENT AND TRADEMARK OFFICE
CERTIFICATE OF CORRECTION

PATENT NO. : 4,298,472
DATED : November 3, 1981
INVENTOR(S) : Jean-Pierre Durand et al It is certified that error appears in the above—identified patent and that said Letters Patent is hereby corrected as shown below:

Column 5, line 16: reads "substantially impairing the absorbing efficiency of said"

should read -- substantially impairing the adsorbing efficiency of said --.

Signed and Sealed this

Second Day of March 1982

[SEAL]

Attest:

GERALD J. MOSSINGHOFF

Attesting Officer      Commissioner of Patents and Trademarks